United States Patent [19]

Finch et al.

[11] 4,279,130

[45] Jul. 21, 1981

[54] RECOVERY OF 1,3-BUTADIENE BY FRACTIONAL CRYSTALLIZATION FROM FOUR-CARBON MIXTURES

[75] Inventors: Ray N. Finch; William D. Nash, both of Odessa, Tex.

[73] Assignee: El Paso Products Company, Odessa, Tex.

[21] Appl. No.: 41,308

[22] Filed: May 22, 1979

[51] Int. Cl.³ .............................................. B01D 9/04
[52] U.S. Cl. ...................................... 62/544; 62/538; 585/812
[58] Field of Search ................. 62/532, 538, 539, 544; 585/812–817

[56] References Cited

U.S. PATENT DOCUMENTS

| | | | |
|---|---|---|---|
| 2,540,977 | 2/1951 | Arnold | 585/812 |
| 2,765,921 | 10/1956 | Green | 62/539 |
| 2,780,663 | 2/1957 | Gunness | 585/812 |

Primary Examiner—Norman Yudkoff
Attorney, Agent, or Firm—De Paoli & O'Brien

[57] ABSTRACT

Freezing and melting techniques are described for separating 1,3-butadiene from a mixture of four-carbon compounds by fractional freezing of the liquid mixture and by fractional melting thereof. It has been discovered that when a frozen four-carbon mixture (BB) containing about 36% 1,3-butadiene (BD) is initially frozen, the first frozen fraction of up to about 30% of the mixture is enriched about 80% over the feed sample while the filtrate is decreased in BD about 36%. A second fractional crystallization of the melt and of the filtrate shows continued enrichment and impoverishment as to BD content, respectively. It has also been discovered that when a solidly frozen BB mixture is slowly thawed and the melt is progressively removed, the melt becomes markedly enriched in BD. A continuous fractional crystallization process that uses these discoveries for producing BD at purities greater than 99% is described. Utilizing liquefied natural gas (LNG) as the cryogen source for this process is also suggested, so that the refrigeration need for fractional crystallization of BB can be combined with the heating need for LNG vaporization.

17 Claims, 5 Drawing Figures

Synthetic Crystallization of $C_4$ Hydrocarbon Mixture

RECOVERY OF 1,3-BUTADIENE BY FRACTIONAL CRYSTALLIZATION FROM FOUR-CARBON MIXTURES

BACKGROUND OF THE INVENTION

1. Field of the Invention

This invention relates to processes for purifying or separating liquids and particularly relates to processes involving heating or cooling for separating specific liquids from a mixture. It especially relates to cryogenic fractional crystallization and the application thereof to four-carbon mixtures including 1,3-butadiene which may hereinafter be referred to simply as butadiene.

2. Review of the Prior Art

In recent years, hydrocarbon mixtures containing n-butenes and isobutylenes have been secondarily produced in great quantities. An example thereof is the $C_4$ distillation fraction from the refining of petroleum naphtha. In this $C_4$ fraction, the constituents include isobutane, n-butane, isobutylene, 1-butene, cis-2-butene, trans-2-butene, and 1,3-butadiene. These are all very similar to one another in many of their physical and chemical properties. Accordingly, separation and purification of these constituents by conventional distillation procedures are difficult so that producing four-carbon materials of high purity is fairly expensive. Nevertheless, there are numerous processes which require highly pure four-carbon compounds as a raw material, such as the production of 1,3-butadiene from n-butenes and the production of methacrolein or methacrylonitrile from isobutylene. Clearly, a method for isolating one or more specific compounds that is based upon other properties than their boiling points is highly desirable.

One possibility is to utilize the freezing points of the components of a $C_4$ hydrocarbon mixture because n-butane melts at $-135°$ C., isobutane melts at $-145°$ C., butene-1 melts at $-185°$ C., cis-2-butene melts at $-138°$ C., trans-2-butene melts at $-106°$ C., and 1,3-butadiene melts at $-109°$ C. No application of such separation by melting points is known, however, although U.S. Pat. No. 2,622,115 discloses a process for purifying binary mixtures by fractional crystallization, mentioning that cis and trans-2-butene are an eutectic pair and indicating that either component can theoretically be removed from the mixture in a pure state. U.S. Pat. No. 2,632,314 describes a fractional crystallization apparatus.

U.S. Pat. No. 2,912,469 describes a fractional crystallization process which includes feeding an immiscible liquid with the multi-component composition.

U.S. Pat. No. 3,077,744 discloses a multi-stage fractional-freezing process for separating a highly purified isoprene fraction from a mixture of $C_5$ hydrocarbons. This process utilizes a series of low-temperature exchange coolers in which the wall film of solids is scraped away by rotating scrapers having spring-loaded blades to form a solids-liquid mixture which flows to a solids-liquid separator (such as a filter or centrifuge). Solids are removed, and liquid is sent to the next cooler. The final product contains about 70% isoprene. The process thus utilizes normal freezing of a liquid by contact with a cold surface.

U.S. Pat. No. 3,264,363 discusses purification of five-carbon mixtures with liquid methane by direct contact of the methane with the mixtures so that it is an extraction type of process rather than a fractional crystallization process.

Crystallization processes from the melt utilize differences in melting points of the components in a mixture. According to an article in Hydrocarbon Processing, Dec. 19, 1966, pages 97–102 by John E. Powers, commercial separation and purification processes using crystallization from the melt can be grouped according to three basic procedural approaches: normal freezing, zone refining, and column crystallization in which there is differential countercurrent contacting of crystals and melts.

Zone refining or zone melting has had considerable usage in the production of high-purity materials for semiconductors, but this procedure has been limited as to size of equipment because the solid-liquid interfaces forming the zone are distorted by heat transfer from natural convection. Consequently, even though some organic materials of high purity have been produced by zone refining on a commercial basis, wide-spread application thereof has been significantly hampered.

Column crystallization appears to be well suited to commercial scale processing for hydrocarbons such as $C_4$ mixtures. In a column crystallizer, solid and melt are moved counter-currently in intimate contact so that there is adequate reuse of energy of crystallization and the possibility of operating a single crystallization unit under steady-state, continuous flow conditions without handling any solids externally of the unit. Moreover, the products from column crystallizers are frequently in excess of 98 weight percent purity after a single pass through the column. Column crystallizers can be center fed or end fed. A suitable center-fed column crystallizer is provided with a spiral-type conveyor, a freezing section at its upper end, and a melting section at its lower end. An end-fed column crystallizer is suitably provided with a melting section at its lower end and a chiller at its feed end to provide crystals to be packed into a bed above the melter with a circumannular filter surrounding the upper end of the bed for removing mother liquor therefrom. The high-purity product emerges from the bottom beneath the melter.

In order to consider the utilization of fractional crystallizers for processing the large quantities of $C_4$ mixtures that are available from the petroleum industry at the present time, it is necessary to have available large quantities of refrigeration. However, there are numerous cryogenic processes which can supply the low-temperature refrigeration which is needed, such as hydrocarbon cascade systems, multistage expansion systems, and the like.

Excessive energy usage will not occur if adequate insulation is used and efficient heat exchangers are installed. High vacuum insulation, multiple-layer vacuum insulation, and evacuated powder insulation are preferred, particularly with a vacuum of at least $10^{-4}$ mm Hg.

Moreover, low-level refrigeration can be obtained by vapor-compression refrigeration of the BB stream, using propane or ammonia for condensing and discharging the heat therein to cooling water. The BB stream is preferably at least pre-cooled by such a system for refrigerated storage or for direct combination with a cryogenic process.

In certain coastal areas, particularly where deep-water port facilities are located close to an oil refinery, there are receiving terminals for vaporizing liquefied natural gas (LNG), which is being shipped on a large scale in ocean-going tankers, for use by industrial and private consumers. In these terminals, LNG at −260° F. (−162° C.) is converted to the vapor state, usually around ambient temperatures. As discussed in Chemical Engineering Progress, Volume 68, Number 9 for September 1972, much heat transfer equipment is needed for both base load LNG plants and for peak shaving LNG plants.

The type of equipment for such vaporization is dictated in many cases by environmental requirements as well as by available heating media. Some of the systems which have been suggested and put into use are submerged combustion systems, intermediate fluid systems in which another fluid is heated and then used to evaporate the LNG, and direct systems in which there is a heat exchange between the LNG and air or water. When using water from rivers or oceans, an open rack exchanger is quite effective.

If fuel is burned, i.e., using LNG as the fuel, in a submerged combustion system or in intermediate fluid systems, the fuel consumption is 1.5–2% of the LNG, but this type of unit is frequently selected because its capital cost is low. An open rack exchanger may cost three or four times as much, but its operating cost may be 1/5 to as little as 1.10 of the combustion system.

Moreover, the amount of heat that is needed for vaporizing the immense quantities of LNG being shipped is not inconsequential. For example, a one-billion standard-cubic-foot/day receiving terminal requires water on the order of 200,000 gallons per minute and uses 6-foot to 8-foot diameter water mains. There are environmental requirements which must also be considered with respect to thermal pollution and other ecological impacts. Therefore, some means for combining the need for refrigeration in a fractional crystallization process and the need for heat in an LNG vaporization process is highly desirable.

SUMMARY OF THE INVENTION

It is therefore an object of this invention to provide a process for removing 1,3-butadiene from a $C_4$ mixture on a large scale and on a continuous basis.

It is also an object to provide a process in which both normal freezing and column crystallization are combined in successive stages of a fractional crystallization process.

It is further an object to provide a process for successively separating a plurality of pure compounds from a mixture of four-carbon compounds.

It is another object to provide a process in which the heat removed by fractional crystallization of a $C_4$ mixture is made available for vaporizing liquefied natural gas.

Therefore, in accordance with these objectives and the principles of this invention, a cryogenic process is herein provided for purifying four-carbon hydrocarbon mixtures (mixed $C_4$'s) by multistage fractional crystallization within a center-fed column crystallizer having a mechanically driven continuous spiral conveyor as the primary means of crystal transport, with the assistance of gravity, and as a wall scraping means. The column is equipped with a filter at each end, a freezing section at its upper end, and a melting section at its lower end. The filters are disposed adjacent to the inner ends of the respective freezing and melting sections. The freezing filter retains solids in the outgoing spent $C_4$ filtrate, and the melting filter excludes solids in the recycled $C_4$ component. The column is vacuum insulated. Spend $C_4$ filtrate, comprising $C_4$ hydrocarbon other than the $C_4$ component product is removed from the freezing filter by a top reflux pump, and $C_4$ component is removed from the bottom of the column, below the melting section, by a bottoms reflux pump. Reflux spent $C_4$ filtrate is returned to the top of the column, above the freezing section, and reflux $C_4$ component is returned to the melting filter.

Spent $C_4$ filtrate and $C_4$-component product pass through a heat exchanger, functioning as a $C_4$ cooler and economizer, counter-currently to the inflowing $C_4$ stream of a naphtha-fed ethylene plant which is typically stored at about 32° C. and 100 psig. This $C_4$ feed stock is cooled to −42° C. against the spent $C_4$ filtrate and $C_4$-component product. Both spent $C_4$ filtrate and $C_4$-component product streams are then sent to product storage. 1,3-butadiene is a preferred $C_4$-component product.

The inflowing $C_4$ mixture stream continues on through a sub-cooler or feed chiller which uses a cryogen cooling fluid, such as LNG, to reduce the feed temperature to just above the point where crystals start forming (about −130° C.). The stream then enters the center of the continuous crystallization column and undergoes gradual further cooling as it meets the cold crystals flowing downwardly from the freezing section at the top of the column which is at −150° C., approximately the optimum temperature for maximum cooling and recovery of butadiene. Heat of fusion (approximately 52.4 Btu/lb) is simultaneously absorbed by the liquid.

Because the bottom of the column is receiving heat and the top of the column is losing heat, there tends to be a temperature gradient from warmer conditions (−109° C.) at the bottom of the column to colder conditions (−150° C.) at the top of the column. When the $C_4$ mixture comprises this $C_4$ component, crystals of 1,3-butadiene consequently form within the body of the liquid and on the metal surfaces and slowly settle towards the melting section as the increasingly spent liquid flows upwardly.

Data demonstrating the feasibility of fractional crystallization by normal freezing and of fractional crystallization by sequential melting of a frozen $C_4$ hydrocarbon mixture, upon which the continuous cryogenic process is based, are also presented. Such data demonstrate the compatibility of the temperature range for fractional crystallization of a $C_4$ mixture stream with the vaporization temperature range of large-volume LNG cargoes. This compatibility indicates that it is practical to solve the separation problem for mixed $C_4$'s and the vaporization problem for LNG by a combined process involving heat exchange, freezing, melting, and vaporizing. Indeed, this invention appears to be best suited for using LNG vaporization as the cryogenic cooling means for fractionally crystallizing a desired $C_4$-component product from a $C_4$ mixture stream. However, it is certainly not limited to this means of refrigeration. The freezing section of the continuous crystallization column is suitably cooled by any indirect refrigeration system capable of supplying the required semicryogenic temperatures, such as, for example:

(a) multistage compression and expansion systems; (b) split-stage compression, absorption, and primary vaporization of a liquid, (c) Joule-Thompson effect in gases; (d) gas expansion to external work; (e) hydrocarbon cascade systems; or (f) any combination of these systems.

DESCRIPTION OF THE PREFERRED EMBODIMENTS

The invention may be more fully understood by study of the following description including examples which disclose a commercially practicable process for sequentially isolating 1,3-butadiene and other C$_4$ compounds from a C$_4$ mixture by a column crystallization process which utilizes differential countercurrent contacting of crystals and melts.

Figure 1:
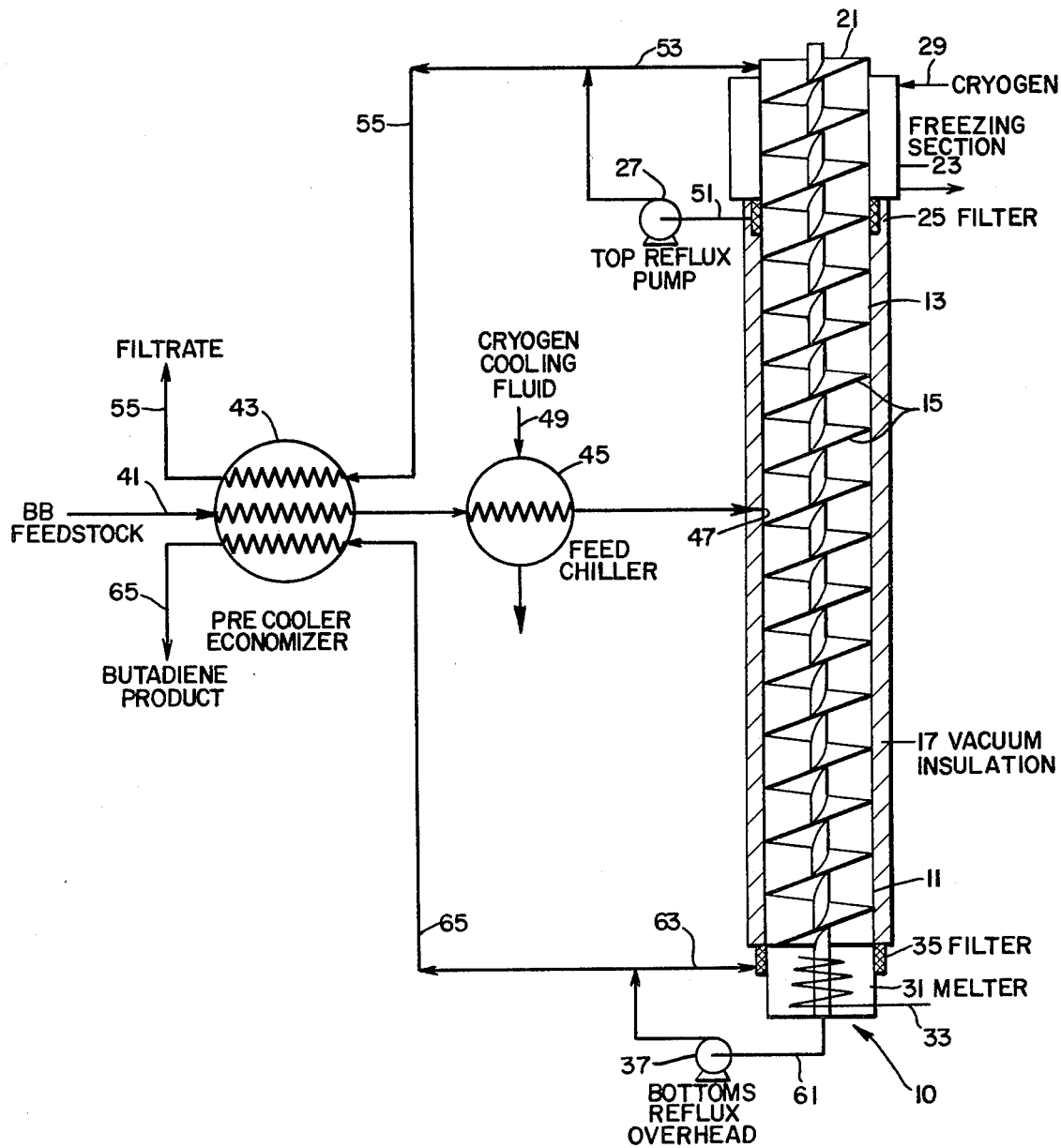
FIG. 1 is a partially sectional flow diagram of a commercially useful process for recovering 1,3-butadiene from a C$_4$ hydrocarbon mixture by means of a continuous crystallization column.

Referring to the drawings, FIG. 1 shows a continuous crystallizer 10 having an outer wall 11, a spiral conveyor with shaft 13 and spiral blades 15 acting as a scraper on wall 11, a freezing section 21, and a melting section 31. Wall 11 is surrounded by a vacuum installation 17 which is preferably maintained at at least $10^{-4}$ mm Hg. A cryogen 29 at $-155°$ C. circulates through the circumannular freezing chamber 23 which cools freezing section 21 to about $-150°$ C.

Melting section 31 receives heat from a melting means 33, which can be an electrical heating means. Circumannular freezing filter 25 is placed immediately beneath freezing section 21, and circumannular melting filter 35 is placed immediately above melter 31.

Top reflux pump 27 withdraws spent filtrate 51 from filter 25, circulates a portion thereof as reflux 53 to the top of frozen section 21 above chamber 23, and sends the remainder to a precooler and economizer 43. Bottoms reflux pump 37 withdraws 1,3-butadiene product 61 from the bottom of column 10, circulates a portion as reflux 63 into filter 35, and sends the remainder as stream 65 through precooler/economizer 43.

An inflowing C$_4$ stream from a naphtha-fed ethylene plant is taken from storage at about $32°$ C. and 100 psig as stream 41. It passes through precooler/economizer 43, within which it loses heat to streams 55, 65, and continues into feed chiller 45 for the C$_4$ hydrocarbon mixture, wherein it loses additional heat to cryogen cooling fluid 49, and enters column 10 at midsection 47. C$_4$ mixture stream 41 is cooled to about $-42°$ C. against spent filtrate stream 55 and butadiene stream 65. It is at a temperature of $-130°$ C. after exiting from feed chiller 45. At this temperature, crystals are beginning to form. The stream moves generally upwardly, countercurrently to downwardly falling crystals which are at a lower temperature. Some of the liquid is carried downwardly by the crystals into the lower part of column 10. Because the melting section 31 is maintained at a temperature near the melting point of pure butadiene (approximately $-109°$ C.) and the spent filtrate within freezing section 21 is maintained at a temperature of about $-150°$ C., there is a marked temperature gradient from the top to the bottom of column 10. The downwardly falling crystals tend to melt in exchange with the liquid in the lower part of the column so that the material approaching melting section 31 tends to be highly enriched in 1,3-butadiene. When reflux stream 63 passes through filter 35 and combines with this enriched material, impurities are almost entirely excluded, so that product stream 61 is at least 99% pure 1,3-butadiene and readily attains 99.6% purity.

Although the density of the liquid within column 10 decreases about 10% from the top to the bottom, it has been observed in laboratory experiments that the crystal solution is heavier than the liquid, thus tending to drive it downwardly through the melting section. The reflux ratio of stream 63 to stream 65 is preferably no higher than 1:1.

Typically, the C$_4$ fractions derived from naphtha steam crackers represent about 25% of the ethylene that is produced and contain about 30-80% of 1,3-butadiene. Because the naphthas vary considerably in their compositions, these C$_4$ fractions contain a wide range of C$_4$ components but are definitely not a binary mixture but rather a complex mixture of at least eight hydrocarbons and typically more than twelve, counting trace acetylenes. Furthermore, it has been discovered that this hydrocarbon mixture forms a solid solution rather than eutectic systems. C$_4$ mixture stream 41 typically contains the following components (other than trace materials) which are listed hereinafter with their melting points and heats of fusion:

TABLE I
PROPERTIES OF C$_4$ COMPONENTS

| C$_4$ Component | Melting Pt, °C. | Heat of Fusion Btu/lb |
| --- | --- | --- |
| trans-2-butene | $-106$ | 74.82 |
| 1,3-butadiene | $-109$ | 63.51 |
| n-butane | $-135$ | 34.52 |
| cis-2-butene | $-138$ | 58.13 |
| isobutene | $-140$ | 45.45 |
| isobutane | $-145$ | 34.13 |
| propylene | $-185$ | 34.38 |
| 1-butene | $-185$ | 29.51 |

Spent filtrate stream 55 can be defined as having the following content of components as a range of weight % analyses obtained by gas chromatography:

TABLE II

| Spent C$_4$ Filtrate Components | Weight % Analysis |
| --- | --- |
| n-Butane | 4-8 |
| 1-Butene | 14-23 |
| Isobutylene | 41-45 |
| trans-2-Butene | 4-8 |
| cis-2-Butene | 6-10 |
| 1,3-Butadiene | 8-23 |
| Propylene + Isobutane | 1-3 |
| Propane + unknowns | 0-1 |

EXAMPLE 1

Butadiene samples were run through a 50-inch fractional crystallization column having a freeze temperature of $-135°$ C. to $-140°$ C. in the liquid near the bottom of the column. The filtrates from freeze-thaw runs therein, corresponding to SBB stream 55 in the process of Example 1, had the following typical analysis, as weight percentages obtained by gas chromatography.

TABLE III

| Spent C$_4$ Filtrate Components | Weight % Analysis |
| --- | --- |
| n-Butane | 4.7 |
| 1-Butene | 14.7 |
| Isobutylene | 41.1 |
| trans-2-Butene | 7.7 |
| cis-2-Butene | 6.5 |
| 1,3-Butadiene | 23.0 |
| Propylene + Isobutane | 1.8 |
| Propane + unknowns | 0.5 |

EXAMPLE 2

Spent C$_4$ filtrate 55 is next pumped to another continuous column crystallizer after by-passing precooler/economizer 43. This second column is similar to crystallizer 10 in FIG. 1 or to an end-fed crystallizer column which can be a pulsed column. The SBB is further fractionally crystallized in the second column to isolate another C$_4$ component. Then its filtrate product is pumped to a third continuous column crystallizer within which a third C$_4$ component is isolated and from which another filtrate product is recovered. This thrice-spent filtrate can be further crystallized to isolate other C$_4$ components. For example, 1,3-butadiene, isobutylene and 1-butene can be successively isolated from a BD stream 41 within three sequentially arranged columns; alternatively, depending upon the composition of 1,3-butadiene stream 41, 1,3 butadiene, 1-butene, and isobutylene can be isolated in sequence.

EXAMPLE 3

The filtrates from the freeze-thaw runs of Example 2 were run through the 50-inch column to simulate a second-stage operation at a freeze temperature of −155° C. to −160° C. The second-stage filtrates, similar to SBB stream 55 in the first-stage process of Example 1, had the following typical analysis, as weight percentages obtained by gas chromatography:

TABLE IV

| Spent C$_4$ Filtrate Components | Weight % Analysis |
| --- | --- |
| n-Butane | 5.7 |
| 1-Butene | 18.3 |
| Isobutylene | 45.0 |
| trans-2-Butene | 7.2 |
| cis-2-Butene | 8.0 |
| 1,3-Butadiene | 13.2 |
| Propylene + Isobutane | 2.1 |
| Propane + unknowns | 0.5 |

EXAMPLE 4

The fractional crystallization runs described in Example 2 were repeated numerous times under slightly varied operating conditions. Butadiene streams that varied in 1,3-butadiene concentration were obtained. To show the filtrate product resulting from relatively ideal operating conditions, the three "best" runs (as to 1,3-butadiene concentration in the 1,3-butadiene product) were selected, and their filtrates were averaged to produce the following analysis, as weight percentages obtained by gas chromatography:

TABLE V

| SBB Components | Weight % Analysis |
| --- | --- |
| n-Butane | 7.2 |
| 1-Butene | 22.7 |
| Isobutylene | 43.7 |
| trans-2-Butene | 4.1 |
| cis-2-Butene | 10.0 |
| 1,3-Butadiene | 8.5 |
| Propylene + Isobutane | 2.9 |
| Propane + unknowns | 0.9 |

EXAMPLE 5

BD enrichment by fractional freezing was investigated by putting 0.50 ml of C$_4$ hydrocarbon mixture into a 10-cm test tube immersed in dry ice/acetone. The tube was then put into a n-pentane/liquid nitrogen slush at −126° to −128° C. No crystals appeared during a 30-minute immersion. The tube was next put into a liquid N$_2$ slush bath of 1:1 iso-pentane: n-pentane (v/v). The slush bath at −145° C. reached to about ⅔ of the liquid level in the tube. Crystals appeared within five minutes. The liquid portion of the sample was removed by suction through a filter stick. The crystals that were left in the test tube were melted and measured to be 15 ml. Analysis of the 15 milliliters of melt showed that it was 84% enriched in 1,3-butadiene as compared to the feed sample. The filtrate was measured to be 33 ml and showed a 36% decrease in 1,3-butadiene.

The melt froze solid within 5–10 minutes upon being put back into the slush bath at −145° C. The filtrate yielded no crystals in the same slush bath even after 20 minutes immersion therein. However, the filtrate did produce crystals within 5–10 minutes at −148° C. These crystals were isolated from the first filtrate to produce a second filtrate. The melt from these isolated crystals showed a 68% increase in 1,3-butadiene relative to the first filtrate. The second filtrate showed a decrease of 24% in 1,3-butadiene relative to the first filtrate.

EXAMPLE 6

Fractional melting was studied by freezing a 300-gram mixture of isomers of butene, butane, and butadiene to low temperatures, such as −160° C., in a well-insulated one-liter glass vessel that had an outer jacket through which coolant (cold nitrogen gas) was passed. The frozen mixture was then allowed to warm slowly. Melt samples were arbitrarily pulled for gas chromatographic analysis through a porous glass filter by means of suction.

Figure 2:
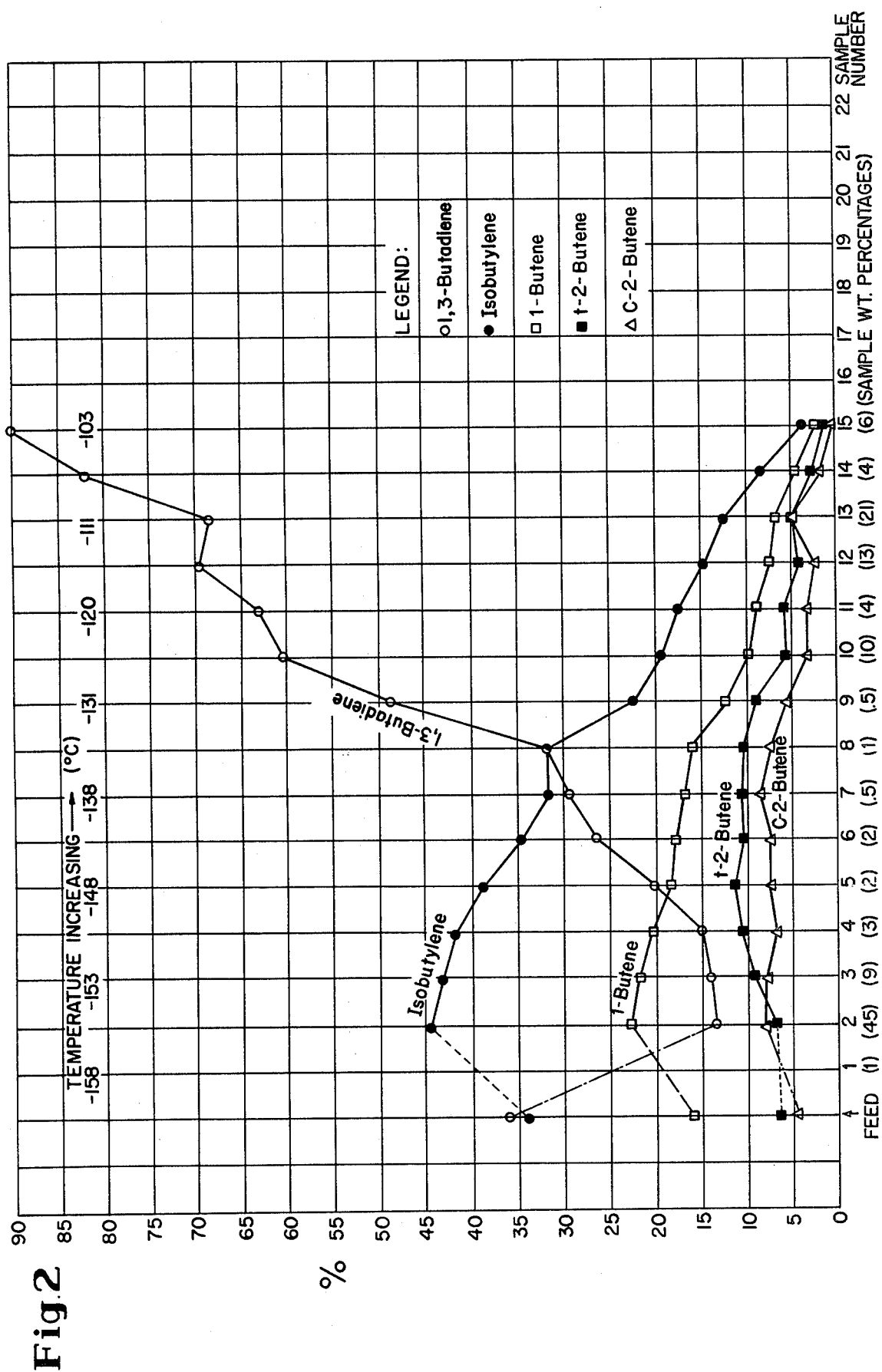
FIG. 2 is a graph of sample weight percentages obtained by sequentially melting a hard-frozen ($-160°$ C.) C$_4$ mixture sample.

As shown in FIG. 2, the successive samples became progressively more and more enriched in 1,3-butadiene (BD) while other components tapered down in concentration from left to right while progressing from the feed composition to the composition of Sample 15. Sample Number 1 was contaminated by non-frozen feed in the exit line so that its data are omitted in FIG. 2.

EXAMPLE 7

Figure 3:
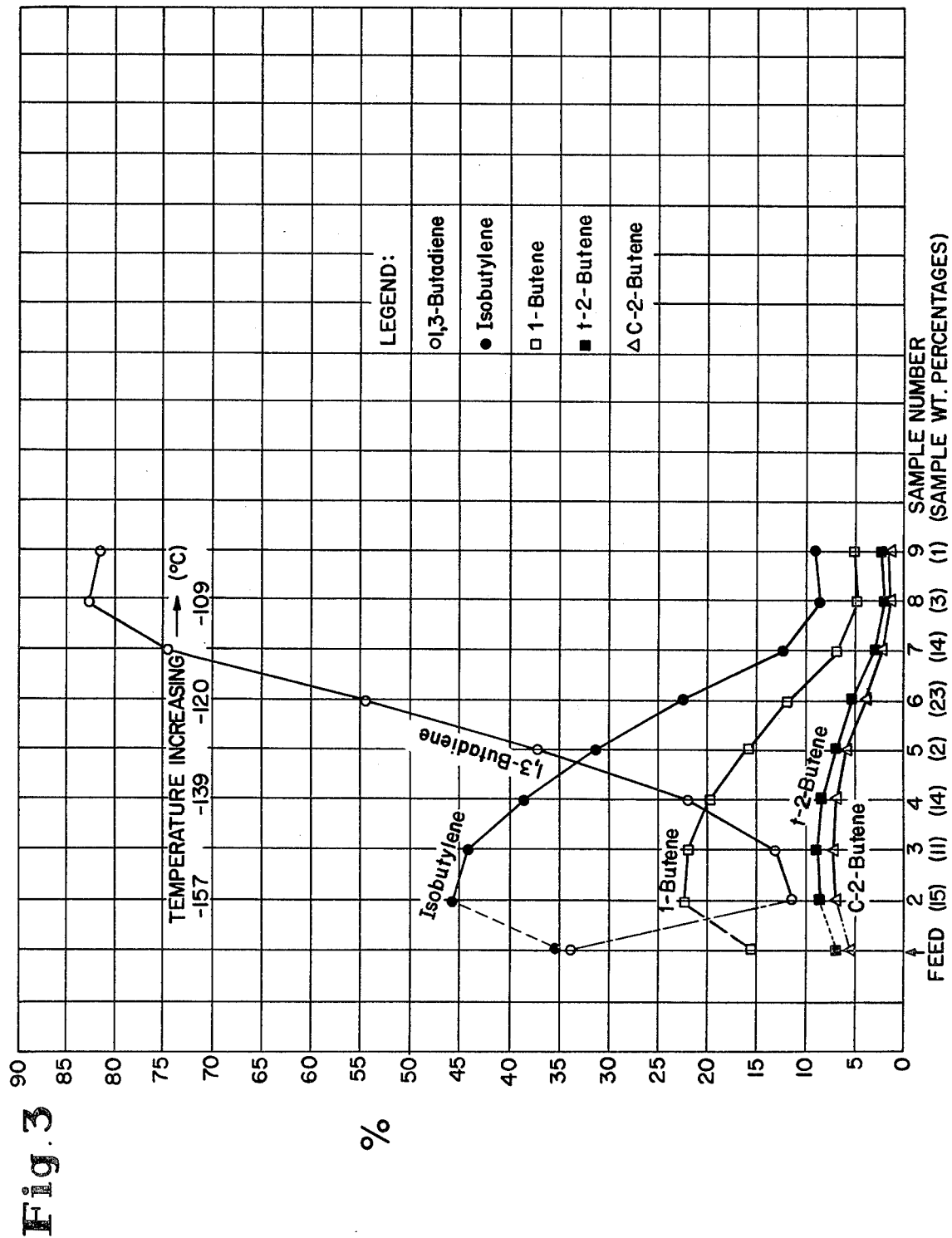
FIG. 3 is a graph, similar to FIG. 2, of sample weight percentages obtained by sequentially melting another hard-frozen ($-160°$ C.) C$_4$ hydrocarbon sample.

Another sample of BB, also approximately 300 grams of a mixture of isomers of butene, butane, and butadiene, was frozen in the same equipment to −160° C. and similarly allowed to warm up slowly. As shown in FIG. 3, a smaller number of samples were pulled by means of suction through the porous glass filter, but the enrichment of the melts in terms of BD is even more pronounced.

EXAMPLE 8

Figure 4:
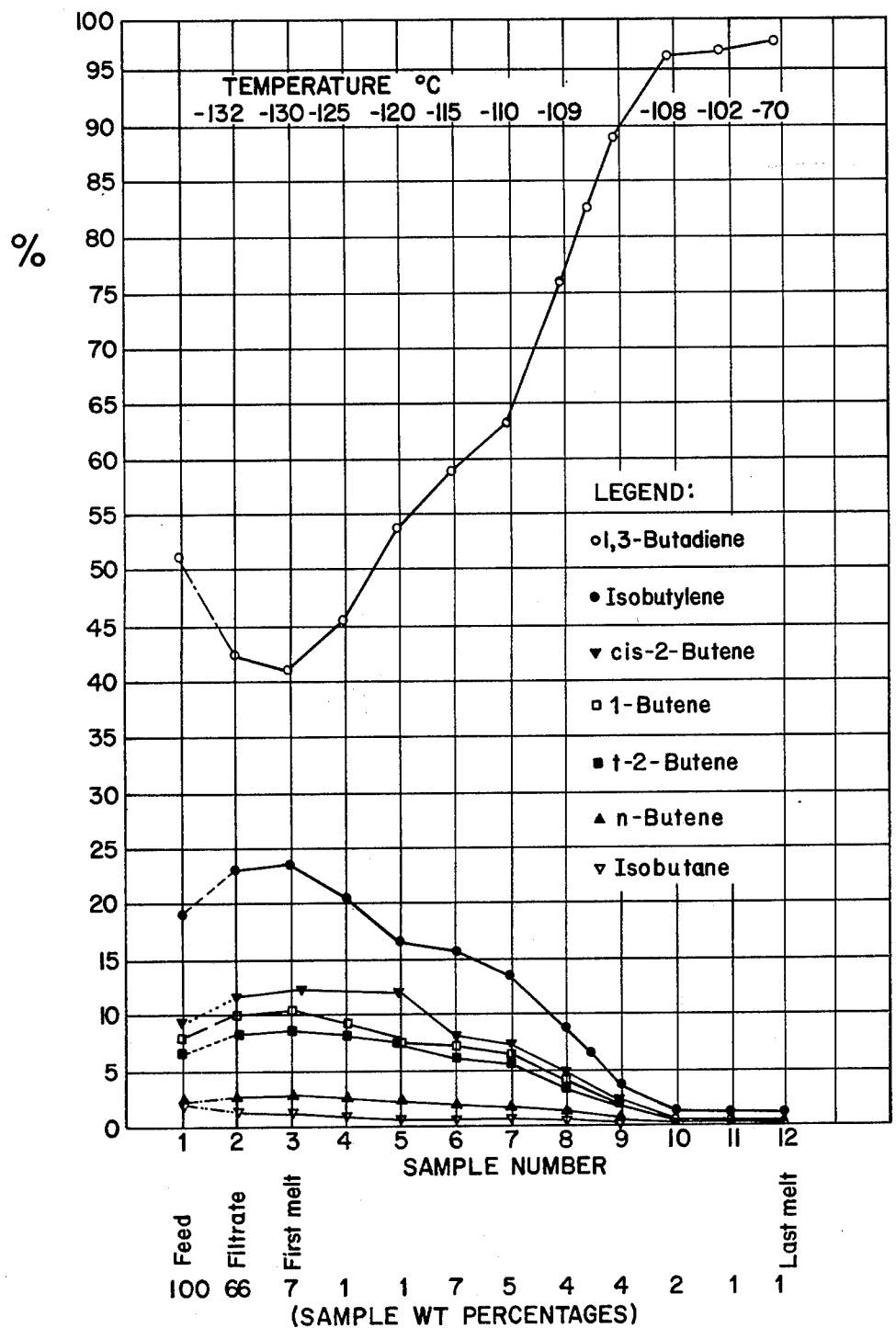
FIG. 4 is a graph, similar to FIGS. 2 and 3, of sample weight percentages obtained by sequentially melting a synthetic sample frozen at $-132°$ C.

A synthetic sample of $C_4$ hydrocarbon mixture, weighing 567 g, was stirred mechanically and frozen to $-132°$ C. in the same equipment used for Examples 2, 3 and 4. The filtrate, weighing 369 g, was removed, and the remaining solids were allowed to melt slowly. Ten samples were then arbitrarily taken and analyzed by gas chromatography. The butadiene concentration increased progressively with the sample sequence up to 98%, while the other components decreased in concentration, as shown in FIG. 4.

EXAMPLE 9

Figure 5:
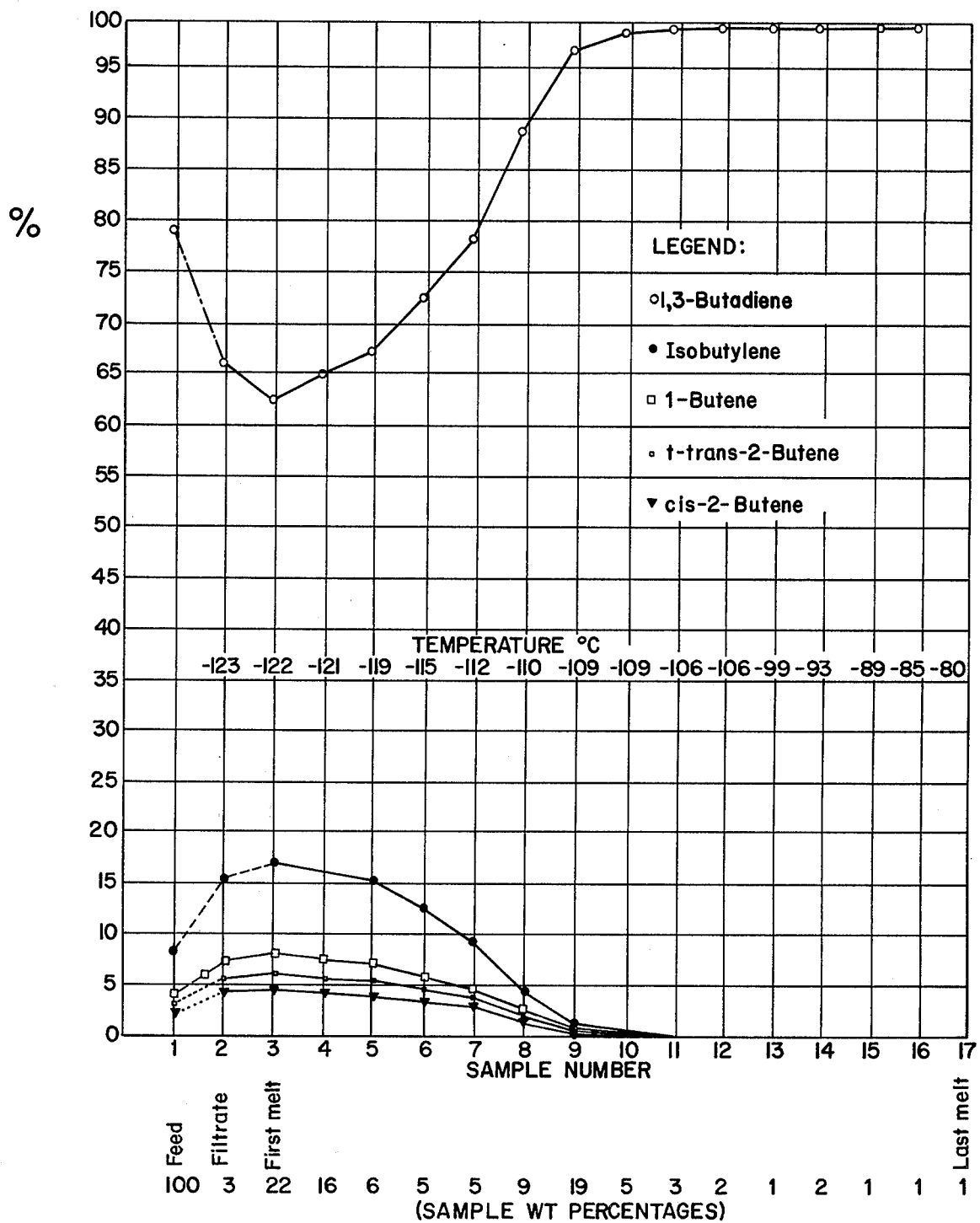
FIG. 5 is a graph, similar to FIGS. 2-4, of sample weight percentages obtained by sequentially melting another synthetic C$_4$ hydrocarbon sample frozen at $-123°$ C.

A sample of another synthetic BB, weighing 542 g and containing about 80% BD, was stirred mechanically and frozen in the same equipment and with the same procedure as used in Examples 3-5. This sample was frozen to $-123°$ C., and the filtrate was removed by vacuum filtration. The remaining solids were allowed to melt slowly, with samples being arbitrarily taken in sequence. The $C_4$ hydrocarbon mixture purity reached 99% by the time that the eighth sample had been taken. The last five samples were greater than 99.6% pure 1,3-butadiene, as shown in FIG. 5.

The data shown in FIGS. 2-5 are derived from batch-type runs and represent only a few stages of fractional crystallization. They indicate, however, that a continuous column which would represent many stages would quite successfully isolate BD from the remaining $C_4$ fractions in a BB stream. Using this information, the process of Example 1 was designed.

Because innumerable modifications of the preferred embodiment discussed hereinbefore can be made without departing from the principles of this invention, what should be interpreted as the scope of this invention is defined by the following claims.

What is claimed is:

1. A continuous fractional crystallization process for recovering 1,3-butadiene product as a first $C_4$ component product and for isolating a filtrate product from a $C_4$-hydrocarbon mixture, comprising:
    A. precooling said $C_4$-hydrocarbon mixture to a temperature at which crystallization is initiated by at least partial heat exchange with said 1,3-butadiene product and by heat exchange with a cryogen;
    B. feeding said precooled mixture to a continuous crystallization column having a freezing section at one end and a melting section at the other end;
    C. withdrawing 1,3-butadiene from said other end, returning a reflux portion thereof to said melting section, and sending the remainder as said 1,3-butadiene product to product disposal; and
    D. withdrawing a spent filtrate, comprising $C_4$-hydrocarbons other than said 1,3-butadiene product from said one end, returning a reflux filtrate portion to said freezing section, and sending the remainder as filtrate product to filtrate disposal.

2. A continuous fractional crystallization process for recovering 1,3-butadiene product as a first $C_4$ component product and for isolating a filtrate product from a $C_4$-hydrocarbon mixture, comprising:
    A. precooling said $C_4$-hydrocarbon mixture to a temperature at which crystallization is initiated by at least partial heat exchange with said filtrate product and by heat exchange with a cryogen;
    B. feeding said precooled mixture to a continuous crystallization column having a freezing section at one end and a melting section at the other end;
    C. withdrawing 1,3-butadiene from said other end, returning a reflux portion thereof to said melting section, and sending the remainder as said 1,3-butadiene product to product disposal; and
    D. withdrawing a spent filtrate, comprising $C_4$-hydrocarbons other than said 1,3-butadiene product from said one end, returning a reflux filtrate portion to said freezing section, and sending the remainder as said filtrate product to filtrate disposal.

3. The process of claim 2 wherein said precooling of said $C_4$-hydrocarbon mixture is partially accomplished by heat exchange to said first $C_4$ component product.

4. The process of claim 3, wherein said cryogen is liquefied natural gas.

5. The process of claim 4, wherein said heat exchange with said liquefied natural gas combines and balances the need for refrigeration in said continuous fractional crystallization process and the need for heat in a vaporization process for said liquefied natural gas.

6. The process of claims 1 or 2, wherein said cryogen is liquefied natural gas.

7. The process of claims 1 or 2, wherein said cryogen is produced by mechanical refrigeration in combination with a cryogenic process.

8. The process of claims 1 or 2, wherein said temperature at which crystallization begins is in the range of $-110°$ C. to $-160°$ C., depending upon the composition of said $C_4$-hydrocarbon mixture.

9. The process of claims 1 or 2, wherein said freezing section is maintained at a crystallization temperature of $-110°$ C. to $-200°$ C.

10. The process of claim 9, wherein said freezing section is first cooled by liquefied natural gas to $-160°$ C.

11. The process of claims 1 or 2, wherein said melting section is maintained at a melting temperature that is slightly above the melting point of said 1,3-butadiene.

12. The process of claim 11, wherein said melting temperature is $-109°$ C.

13. The process of claim 12, wherein said 1,3-butadiene product has a purity greater than 99.6% 1,3-butadiene.

14. The process of claims 1 or 2, wherein said filtrate product is sent to a second continuous crystallization column within which a second $C_4$ component product is isolated and from which a second filtrate product is produced.

15. The process of claim 14, wherein said second filtrate product is sent to a third continuous crystallization column within which a third $C_4$ component is isolated and from which a third filtrate product is produced.

16. The process of claim 15, wherein said third $C_4$ component is 1-butene and said third filtrate product has a reduced content of 1-butene.

17. The process of claim 14, wherein said second $C_4$ compound is isobutylene and said second filtrate product has reduced isobutylene content.

* * * * *